US012609464B2

(12) United States Patent
Wolf

(10) Patent No.: US 12,609,464 B2
(45) Date of Patent: Apr. 21, 2026

(54) CONTACT SPRING WITH CLAMPING OPENING FOR A CONDUCTOR OR CABLE

(71) Applicant: HARTING Electronics GmbH, Espelkamp (DE)

(72) Inventor: Torsten Wolf, Luebbecke (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 285 days.

(21) Appl. No.: 18/282,500

(22) PCT Filed: Apr. 11, 2022

(86) PCT No.: PCT/DE2022/100273
§ 371 (c)(1),
(2) Date: Sep. 15, 2023

(87) PCT Pub. No.: WO2022/228607
PCT Pub. Date: Nov. 3, 2022

(65) Prior Publication Data

US 2024/0145944 A1 May 2, 2024

(30) Foreign Application Priority Data

Apr. 27, 2021 (DE) ..................... 10 2021 110 661.3

(51) Int. Cl.
*H01R 4/48* (2006.01)

(52) U.S. Cl.
CPC ........... *H01R 4/483* (2023.08); *H01R 4/4816* (2023.08)

(58) Field of Classification Search
CPC .............................. H01R 4/483; H01R 4/4816
See application file for complete search history.

(56) References Cited

U.S. PATENT DOCUMENTS 8,500,498 B2 8/2013 Abundis et al. ......... H01R 4/48
9,413,082 B2 * 8/2016 Gassauer ................. H01R 4/48
(Continued)

FOREIGN PATENT DOCUMENTS

DE 1917503 4/1975 ............... H01R 7/28
DE 19646103 3/1998 ............... H01R 4/48
DE 102016111565 12/2017 ............. H01R 12/75
(Continued)

OTHER PUBLICATIONS

International Search Report, with English translation, and Written Opinion issued in PCT/DE2022/100273, dated Jul. 22, 2022, 11 pages.

(Continued)

*Primary Examiner* — Vanessa Girardi
(74) *Attorney, Agent, or Firm* — HAYES SOLOWAY P.C.

(57) ABSTRACT

The invention relates to an electric conductor connection element with a contact part and a contact spring which has a base part that is supported against a counter bearing and a clamping part that can be elastically deflected, is angled relative to the base part, and together with the contact part forms a clamping opening for an electric conductor. The invention is characterized in that the base part of the contact spring is releasably held on the contact part in that the base part has two support zones which engage on the contact part from opposite sides in positions at different distances to the clamping part.

17 Claims, 4 Drawing Sheets

(56) References Cited

U.S. PATENT DOCUMENTS

| | | | | |
|---|---|---|---|---|
| 2013/0029537 | A1 | 1/2013 | Reibke | H01R 11/22 |
| 2019/0157780 | A1 | 5/2019 | Lueckemeier et al. | H01R 12/51 |

FOREIGN PATENT DOCUMENTS

| | | | |
|---|---|---|---|
| DE | 102019124740 | 3/2021 | H01R 4/48 |
| EP | 2234211 | 9/2010 | H01R 9/24 |
| WO | WO2019144987 | 8/2019 | H01R 4/48 |

OTHER PUBLICATIONS

Search Report issued in German Patent Appln. Serial No. 10 2021 110 661.3, dated Dec. 9, 2021, with machine translation, 11 pages.

* cited by examiner

CONTACT SPRING WITH CLAMPING OPENING FOR A CONDUCTOR OR CABLE

CROSS REFERENCE TO RELATED APPLICATIONS

This application is a US National Phase Patent Application of PCT International Patent Application Serial No. PCT/DE2022/100273, filed Apr. 11, 2022, which claims priority to German Patent Application Serial No. 10 2021 110 661.3, filed Apr. 27, 2021, the contents of which are incorporated herein by reference.

BACKGROUND OF THE INVENTION

The invention concerns an electric conductor connection element having a contact piece and a contact spring which has a base part supported on an abutment and an elastically deflectable clamping piece which is angled relative to the base part and which, together with the contact piece, forms a clamping opening for an electric conductor.

Such conductor connection elements serve for example to connect electrical conductors, such as a stripped conductor of a cable, to an electrical device, a plug connector or similar.

DE 10 2016 111 565 A1 and WO 2019/144987 A1 describe conductor connection elements of this type in which the contact spring is a so-called a cage clamp, in which the clamping piece is configured as a bow which extends over the contact piece so that the conductor can be pulled against the contact piece by means of the bow. When the conductor is held clamped in this way in the clamp opening, the contact spring is elastically deflected and a torque acts on the base part. This torque must be absorbed by corresponding counter-torque of the abutment.

In the priority application for the present application, the German Patent and Trademark Office researched the following prior art: DE 19 17 503 B2, DE 10 2016 111 565 A1, DE 10 2019 124 740 A1, U.S. Pat. No. 8,500,498 B2 and WO 2019/144987 A1.

In the known cage clamps, the base part as a whole is approximately U-shaped and has two approximately parallel arms, one of which transforms at the end into the clamping piece and the other of which rests on the abutment. The contact piece is conductively connected to the device to be connected, the plug connector or similar, and may at the same time form the abutment for the base part of the contact spring. Optionally, the contact piece and the contact spring may also be made of one piece.

SUMMARY OF THE INVENTION

The object of the invention is to create a conductor connection element with a compact contact spring.

This object is achieved according to the invention in that the base part of the contact spring is releasably held on the contact piece as the base part has two support zones which act on the contact piece from opposite sides at positions at different distances from the clamping piece.

Because of the two support zones acting on the contact piece from opposite sides, a sufficient counter-torque can be built up over a short length so that a more compact design of the conductor connection element is possible. The separate structure of contact piece and contact spring simplifies the production of the contact piece with the necessary connection elements for the electrical device or plug connector. Secondly however, the contact spring is held on the contact piece by the two support zones so that the two parts of the conductor connection element can easily be handled as one unit.

The clamping piece may be configured in the known fashion as a bow which extends over the contact piece.

In one embodiment, the contact piece has an anchor which extends through an opening of the base part of the contact spring and rests on one of the two support zones on the side of the base part opposite the clamping piece. The base part may have an opening in a position offset to these support zones, through which the anchor can be conducted so that the contact spring and the contact piece can be separated from one another. Optionally, the anchor and the associated support zone may be configured so that the anchor can only enter the wider opening of the base part after overcoming a certain latching resistance. In this way, the contact piece and contact spring are captively held together when assembled.

In another embodiment, a rod-like portion of the contact piece extends through an opening formed in the base part of the contact spring. The two support zones are then formed by two edges of this opening running transversely to the contact piece. On assembly, the contact spring may be pushed axially onto the contact piece.

BRIEF DESCRIPTION OF THE DRAWINGS

Exemplary embodiments are explained in more detail below with reference to the drawing.

In the drawings.

DETAILED DESCRIPTION OF THE DRAWINGS

Figure 1:
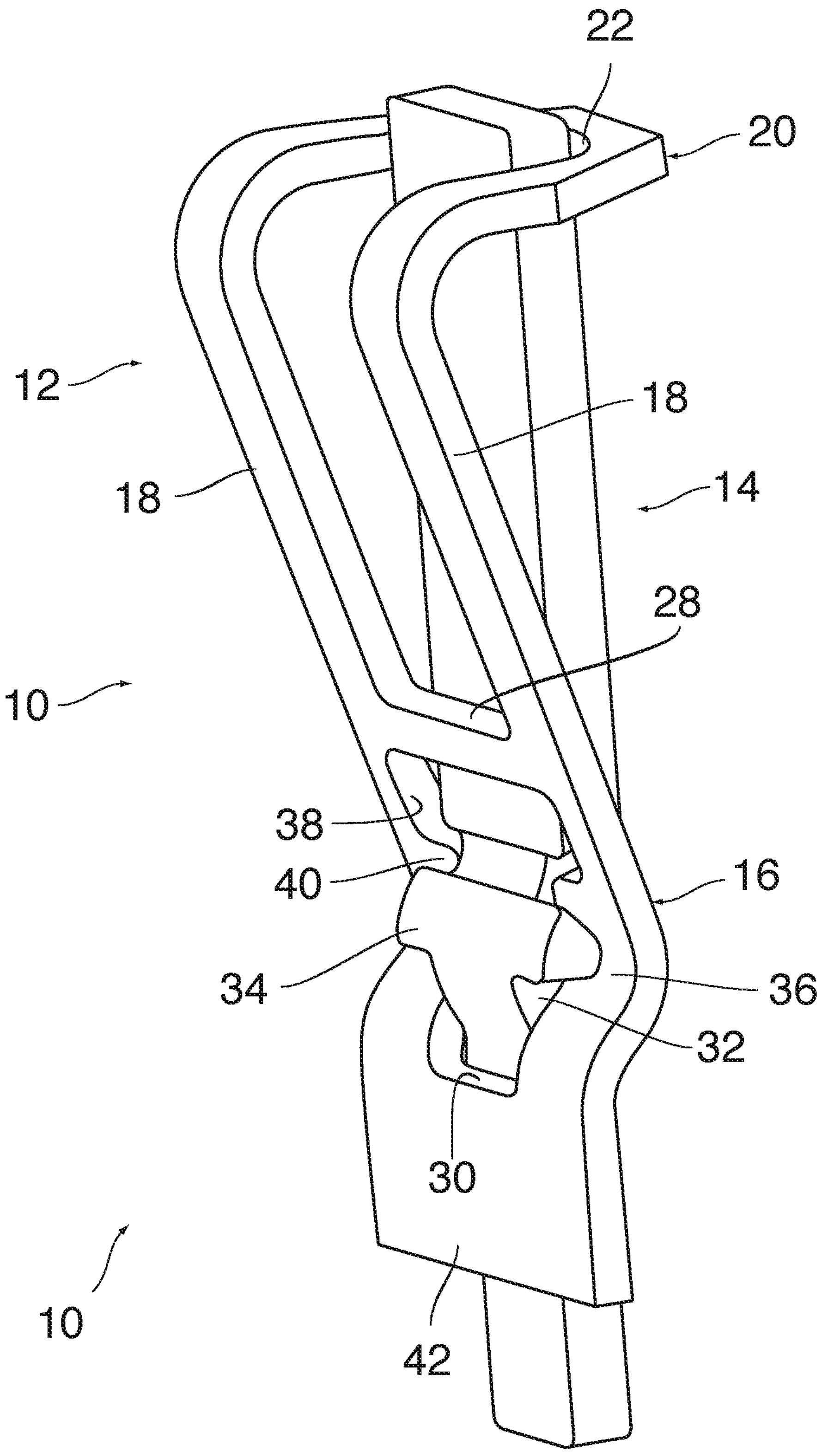
FIG. 1 shows a perspective view of a conductor connection element according to an embodiment of the invention.

FIG. 1 shows a conductor connection element 10 which is formed by two electrically conductive components, e.g. made of metal, namely a contact spring 12 and a contact piece 14, which in this example are generally rod-like. At its lower end in the drawing, the contact piece 14 is electrically connected in any known manner (not shown here) to a further electrical component, for example a contact of an electrical device, a plug connector or similar.

The contact spring 12 has a base part 16 in the form of an S-shaped metal plate by which the contact spring is releasably held on the contact piece 14. The upper region of the base part 16 in the drawing is formed by two parallel elastic arms 18 which transform into a bow-like clamping piece 20 which is angled relative to the base part 16 and extends over the end of the contact piece 14. The clamping piece 20 and the upper end of the contact piece 14 together form a clamping opening 22 for a conductor 24 (FIG. 3), for example a stripped end of a cable or a braid 26.

In FIG. 1, the contact spring 12 is shown in the relaxed state. In this state, the clamping opening 22 is closed. When a conductor is to be introduced into the clamping opening, the clamping piece 20 is pressed to the right in FIG. 1, by hand or by means of an actuator (not shown here), so that the clamping opening 22 opens. A torque now acts on the contact spring 12 clockwise in FIG. 1. The contact piece 14 however forms an abutment which builds up a counter-torque and prevents the base part from rotating, so that the arms 18 are elastically bent. This generates a tensile force acting on the clamping piece 20, which then pulls the conductor introduced into the clamping opening 22 against the contact piece 14 and thus ensures a secure contact.

The two arms 18 of the base part 16 are connected at the end opposite the clamping piece 20 by a crosspiece which forms a first support zone 28 supporting the base part 16 on the contact piece 14. Below this support zone, in its S-shaped portion, the base part 16 has a longitudinal slot 30 through which passes an outward bend 32 of the contact piece 14. This outward bend 32 carries an anchor 34 which is wider than the slot 30. The concave surface regions of the base part 16 on both sides of the slot 30 form a second support zone 36 supporting the anchor 34. The support zones 28 and 36 lie at different distances from the clamping piece 20 and act on the contact piece 14 from opposite sides, and therefore, when the clamping opening is opened, exert a clockwise torque on the contact piece 14. Since the contact piece is however held stationary because of its connection to the other electrical components (not shown here), it forms an abutment which exerts a counter-torque on the contact spring and holds the arms 18 under bending stress.

In the portion between the support zones 28, 36, the slot 30 widens into an opening 38 which is wider than the anchor 34. The opening 38 is delimited towards the support zone 36 by cams 40 which constrict the slot 30 there and lie against the outward bend 32 of the contact piece from opposite sides. In this way, the contact spring 12 is held by form fit in its position relative to the contact piece 14 in the direction parallel to the anchor 34.

The lower end of the base part 16 in FIG. 1 forms a latch 42 which lies on the same side of the contact piece 14 as the support zone 28, and which, together with the anchor 34, prevents the contact spring 12 from being able to pivot counterclockwise relative to the contact piece 14. In this example therefore, the base part 16 of the contact spring is held rotationally fixedly relative to the contact piece 14.

Figure 2:
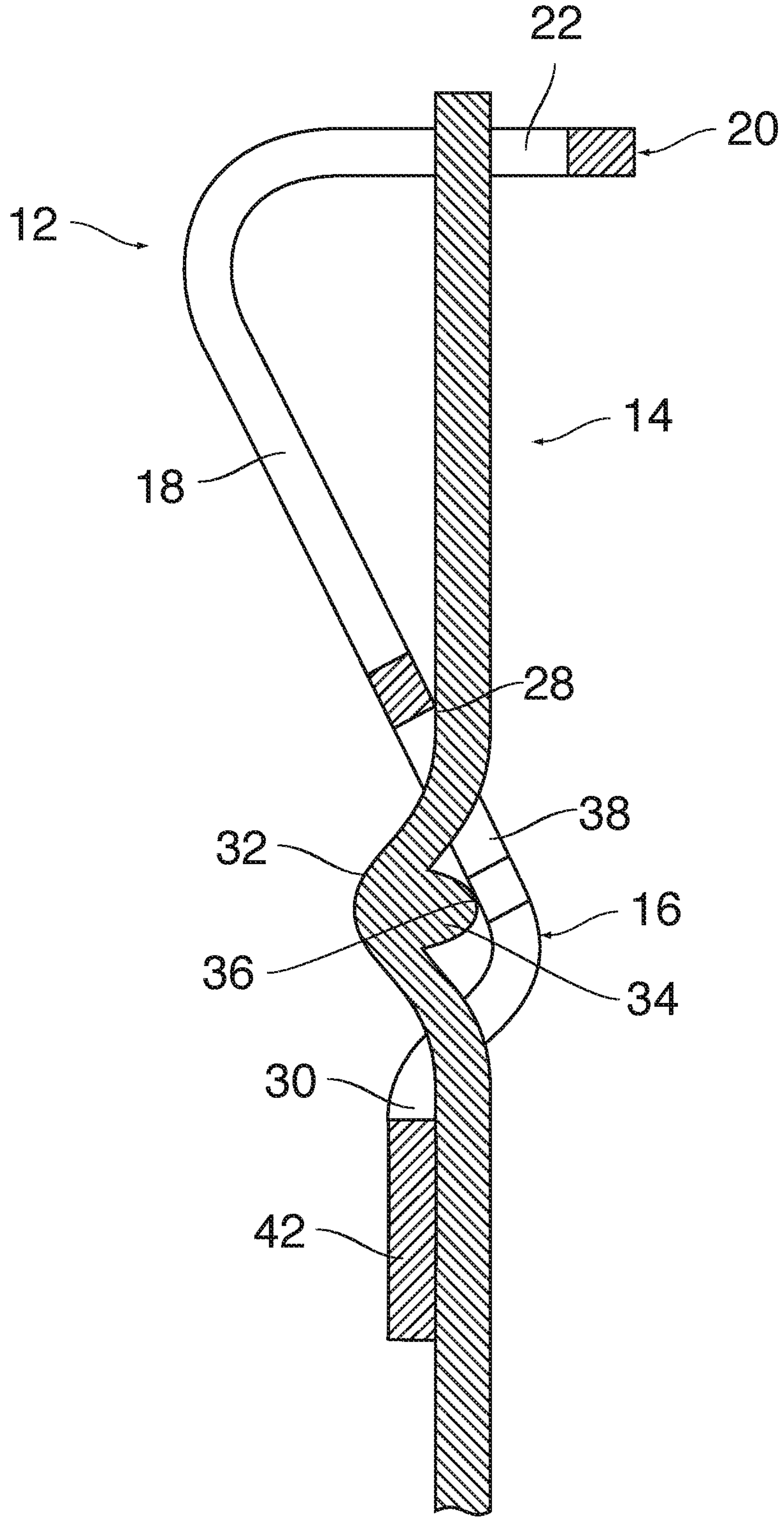
FIG. 2 shows an axial section through the conductor connection element according to FIG. 1.

FIG. 2 shows more clearly how the support zones 28 and 36 act on the contact piece 14 from opposite sides. The support zone 28 is formed by an edge of the crosspiece shown (hatched) in cross-section in FIG. 2. The support zone 36 acts on the anchor 34 projecting from the outward bend 32. Since this anchor 34 protrudes into the concave portion of the base part 16, and also the contact spring 12 is guided by the support zone 28 and the latch 42 parallel to the main axis (vertical in the drawing) of the contact piece 14, the contact spring can slide along this axis relative to the contact piece, in any case within a limited range. In FIG. 2, the contact spring 12 is in the lower end position of this movement range. In this end position, the tip of the anchor 34 rests on a part of the support zone 36 which lies closely below the lower edge of the opening 38 and runs parallel to the arms 18, i.e. is sloping relative to the main axis of the contact piece 14. If however the contact spring is pressed down with a particular force, it can deform elastically so far that the tip of the anchor 34 slides over the lower edge of the opening 38. Then the anchor 34 can enter the wider opening 38. If the contact spring 12 is then turned clockwise, the anchor 34 passes through the opening 38 and the contact spring can be released from the contact piece 14. By reversing this movement sequence, the contact spring can be re-mounted on the contact piece 14 until it engages in the concave support zone 36 again when a particular latching resistance is overcome.

Figure 3:
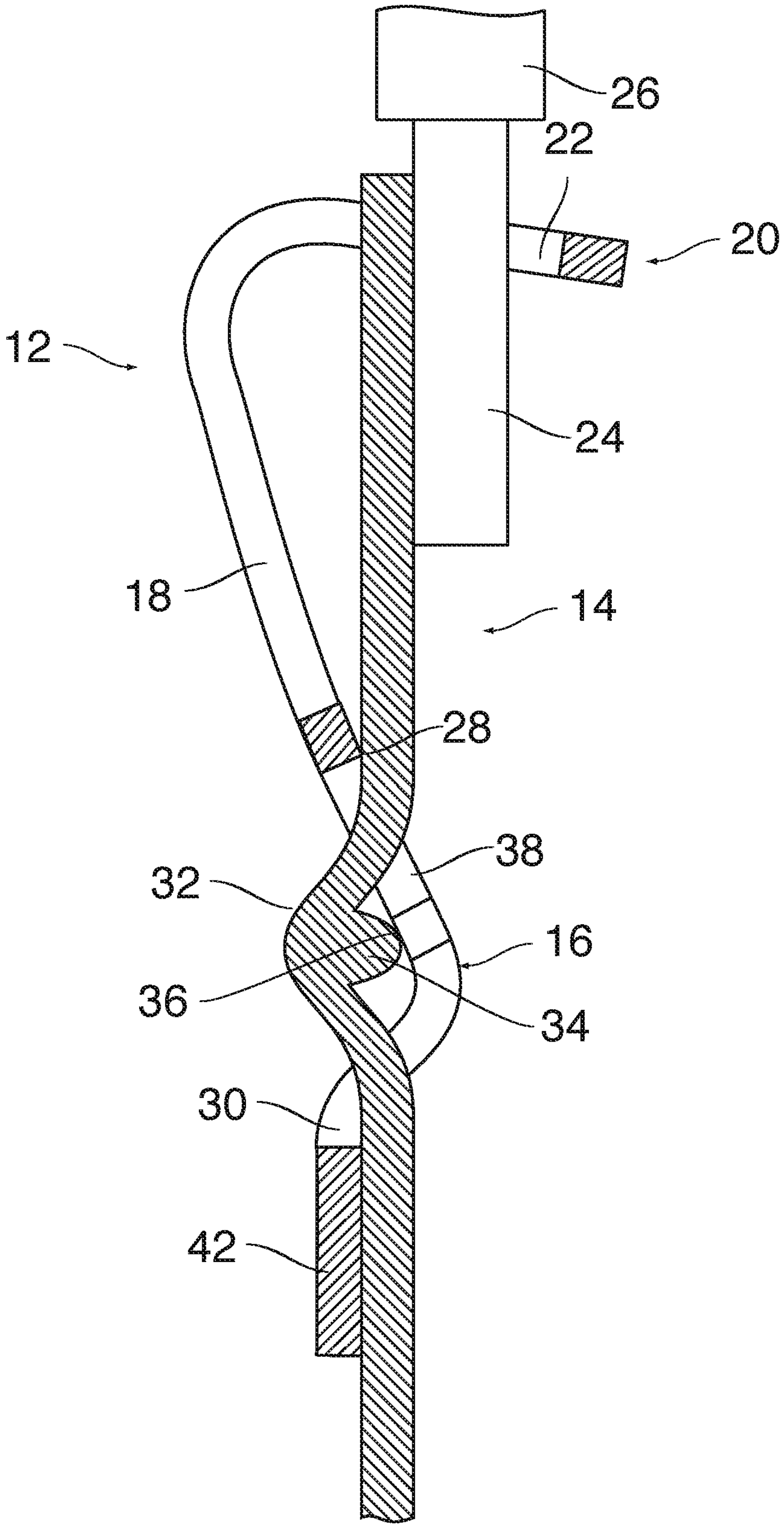
FIG. 3 shows the conductor connection element from FIG. 2 in an open position for insertion of an electrical conductor.

FIG. 3 shows the conductor connection element in a state in which the clamping opening 22 is opened and the arms 18 are bent elastically. When the clamping piece 20 is released in this state, the arms 18 spring back to the left in FIG. 3 and pull the bow 20 against the conductor 24 so that the latter is firmly pressed against the upper end of the contact piece 14.

Figure 4:
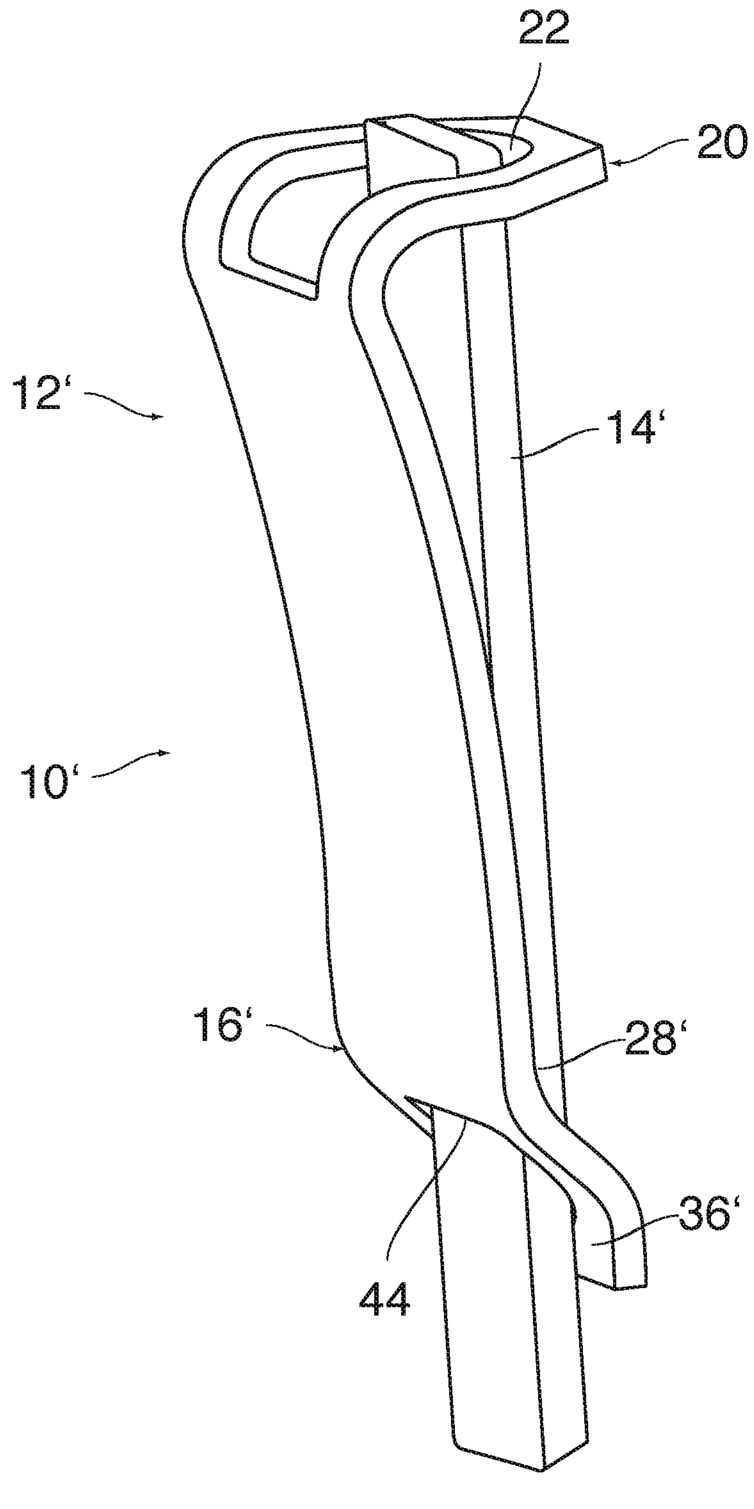
FIG. 4 shows a perspective view of a conductor connection element according to another embodiment.

FIG. 4 shows an embodiment of a conductor connection element 10' with a contact piece 14' in the form of a straight rod, and a contact spring 12', the base part 16' of which is bent in an S-shape at the lower end in the drawing and has an opening 44, through which the contact piece 14' is pushed. Support zones 28' and 36', which prevent a pivoting of the base part relative to the contact piece, are here formed by mutually opposite surfaces of the base part 16' above and below the opening 44. When the clamping opening 22 is opened, the flexible part of the contact spring lies closely against the surface of the contact piece 14'.

If no further fixing means are provided, in this embodiment the contact spring 12' can slide axially on the contact piece 14', and can be released from the contact piece 14' by being pulled up from the contact piece.

The invention claimed is:

1. An electric conductor connection element having a contact piece and a contact spring which has a base part supported on an abutment and an elastically deflectable clamping piece which is angled relative to the base part and which, together with the contact piece, forms a clamping opening for an electric conductor, wherein the base part of the contact spring is releasably held on the contact piece as the base part has two support zones which act on the contact piece from opposite sides at positions at different distances from the clamping piece, and wherein one of the support zones, and a latch formed by the base part and situated beyond the other support zone, lie on the same side of the contact piece and form a linear guide for the contact spring, wherein an anchor and the one of the two support zones delimit the movement play for the contact spring along this linear guide.

2. The conductor connection element as claimed in claim 1, wherein the anchor and the support zone delimit a movement play of the contact spring so that the anchor can only enter the opening after elastic deformation of the contact spring.

3. An electric conductor connection element having a contact piece and a contact spring which has a base part supported on an abutment and an elastically deflectable clamping piece which is angled relative to the base part and which, together with the contact piece, forms a clamping opening for an electric conductor, wherein the base part of the contact spring is releasably held on the contact piece as the base part has two support zones which act on the contact piece from opposite sides at positions at different distances from the clamping piece, and wherein a part of the base part is S-shaped and has a concave surface facing an anchor and forming one of the support zones.

4. The conductor connection element as claimed in claim 3, wherein the base part of the contact spring has an opening, through which a part of the contact piece extends to the opposite side of the base part.

5. The conductor connection element as claimed in claim 4, wherein the contact piece is rectilinear and the contact spring can slide axially on the contact piece.

6. The conductor connection element as claimed in claim 4, wherein the part of the contact piece which extends through the opening of the base part is an outward bend, a tip of which protrudes through the opening of the base part formed as a slot and carries the anchor which rests on one of the support zones on both sides of the slot.

7. The conductor connection element as claimed in claim 6, wherein the base part of the contact spring has an opening through which the anchor can be conducted.

8. The conductor connection element as claimed in claim 3, wherein the clamping piece has the form of a bow which extends over the contact piece.

9. The conductor connection element as claimed in claim 8, wherein the base part of the contact spring has an opening, through which a part of the contact piece extends to the opposite side of the base part.

10. The conductor connection element as claimed in claim 9, wherein the part of the contact piece which extends through the opening of the base part is an outward bend, a tip of which protrudes through the opening of the base part formed as a slot and carries an anchor which rests on one of the support zones on both sides of the slot.

11. The conductor connection element as claimed in claim 8, wherein parallel arms of the bow-shaped clamping piece transform into arms of the base part which are connected together via a crosspiece, and wherein one of the support zones is formed by the crosspiece.

12. The conductor connection element as claimed in claim 11, wherein the base part of the contact spring has an opening, through which a part of the contact piece extends to the opposite side of the base part.

13. The conductor connection element as claimed in claim 12, wherein the part of the contact piece which extends through the opening of the base part is an outward bend, a tip of which protrudes through the opening of the base part formed as a slot and carries an anchor which rests on one of the support zones on both sides of the slot.

14. The conductor connection element as claimed in claim 3, wherein one of the support zones, and a latch formed by the base part and situated beyond the other support zone, lie on the same side of the contact piece and form a linear guide for the contact spring, wherein the anchor and the support zone delimit a movement play for the contact spring along this linear guide.

15. The conductor connection element as claimed in claim 14, wherein the anchor and the support zone delimit the movement play of the contact spring so that the anchor can only enter the opening after elastic deformation of the contact spring.

16. The conductor connection element as claimed in claim 14, wherein the base part of the contact spring has an opening through which the anchor can be conducted.

17. The conductor connection element as claimed in claim 16, wherein the anchor and the contact zone delimit the movement play of the contact spring so that the anchor can only enter the opening after elastic deformation of the contact spring.

* * * * *